United States Patent
Bazin et al.

(10) Patent No.: US 7,195,460 B2
(45) Date of Patent: Mar. 27, 2007

(54) FRANCIS TURBINE

(75) Inventors: Daniele Bazin, Saint Nicolas de Macherin (FR); Michel Henri Couston, Seyssins (FR)

(73) Assignee: Alsom Technology Ltd, Baden (CH)

( * ) Notice: Subject to any disclaimer, the term of this patent is extended or adjusted under 35 U.S.C. 154(b) by 98 days.

(21) Appl. No.: 10/528,142

(22) PCT Filed: Oct. 2, 2003

(86) PCT No.: PCT/FR03/02894

§ 371 (c)(1),
(2), (4) Date: Mar. 17, 2005

(87) PCT Pub. No.: WO2004/031574

PCT Pub. Date: Apr. 15, 2004

(65) Prior Publication Data
US 2006/0051210 A1    Mar. 9, 2006

(30) Foreign Application Priority Data
Oct. 2, 2002    (FR) .................................. 02 12199

(51) Int. Cl.
*F01D 5/12*    (2006.01)
*F03B 13/10*    (2006.01)

(52) U.S. Cl. ............................. 416/223 R; 416/223 A; 416/243

(58) Field of Classification Search ............... 415/206; 416/182, 198 R, 223 B, 223 A, 223 R, 229 R, 416/232, 243
See application file for complete search history.

(56) References Cited

U.S. PATENT DOCUMENTS

| 1,509,653 | A | * | 9/1924 | Kaplan ........................ 416/248 |
| 3,797,965 | A | * | 3/1974 | Tonooka et al. ......... 416/186 R |
| 3,962,506 | A | * | 6/1976 | Dunahoo ..................... 428/158 |
| 4,479,757 | A | * | 10/1984 | Holmes et al. ......... 416/186 R |
| 4,519,746 | A | | 5/1985 | Wainauski |
| 5,352,092 | A | * | 10/1994 | Ferleger et al. ......... 416/223 A |
| 5,480,285 | A | * | 1/1996 | Patel et al. ............. 416/223 A |
| 6,068,446 | A | | 5/2000 | Tangler |
| 6,155,783 | A | * | 12/2000 | Beyer ....................... 416/90 R |
| 2001/0007634 | A1 | | 7/2001 | Beyer |

FOREIGN PATENT DOCUMENTS

| FR | 2052248 | 4/1971 |
| GB | 237963 | 8/1925 |
| WO | WO 02 42638 A | 5/2002 |

OTHER PUBLICATIONS

H. Brekke: "Why not make the turbines cavitation free?", Proc. Int. Conf. on Hydropower, vol. 3, 1997 pp. 1925-1934.

* cited by examiner

*Primary Examiner*—Igor Kershteyn
(74) *Attorney, Agent, or Firm*—Dowell & Dowell, P.C.

(57)    ABSTRACT

A Francis runner and a hydraulic turbine equipped with such a runner, wherein the runner includes a ceiling, a belt, and blades which extend between the ceiling and the belt and which define liquid flow channels therebetween. A ratio (e/L) of a maximum thickness Ce) of each blade to an average developed length (L) of an average fibre of each blade is between 0.1 and 0.2. At a leading edge of each blade, the average fibre is oriented, over essentially an entire height of the leading edge, along a straight line ($\Delta_{23}$), which forms an angle ($\alpha$) greater than 90° relative to a line (U) defining a direction of rotation of the leading edge of the runner.

10 Claims, 4 Drawing Sheets

FRANCIS TURBINE

BACKGROUND OF THE INVENTION

1. Field of the Invention

The invention relates to a Francis runner and to a turbine equipped with such a runner.

2. Description of the Related Art

Francis runners may equip different sorts of hydraulic machines, such as turbines, pumps, or pump turbines. They comprise blades distributed about a central rotating shaft and which define therebetween channels for flow of water. In the case of turbines, the geometry of the blades of these runners is defined so that the flow of the water induces a torque on the runner. The power that a turbine equipped with such a runner can deliver depends on its geometry, particularly on its diameter, in connection with its speed of rotation.

In certain configurations of a Francis hydraulic machine, the diameter of the runner is imposed, particularly in the case of rehabilitation of an installation where the diameter cannot be modified without considerable civil engineering works.

In the case of a conventional Francis turbine, shown partially in plan view and with parts torn away in FIG. 1, the speed V of injection of the water is broken down into a linear speed U of the leading edge B of a turbine blade A and a relative speed W of the jet of water with respect to the blade A. Under these conditions, it is usual to design a Francis turbine runner so that the average fibre M of each blade is oriented along a straight line $\Delta$ making an angle $\alpha$ less than 90° with respect to the linear speed of advance U of its leading edge B.

There have been envisaged, in the Article "Why not make the turbines cavitation free" by Mr. Brekke (Proceedings of International Conference on Hydropower Vol. 3, 1997), different orientations for the leading edge of the blades of a Francis turbine runner.

However, particularly in the case of rehabilitation, the conditions of use of the turbine may be modified, particularly by reduction of the speed of rotation and/or increase of the pressure head, in which case the orientation of the leading edge of the blades is no longer compatible with the angle of incidence of the jet of water. In that case, eddies and/or phenomena of cavitation are created in the proximity of the pressure side and suction side surfaces of the blades, this reducing the efficiency of the hydraulic machine and promoting the phenomena of wear and tear.

SUMMARY OF THE INVENTION

It is a particular object of the invention to overcome these drawbacks by proposing a novel Francis runner able to function satisfactorily under the new conditions of use defined.

In this spirit, the invention relates to a Francis runner which comprises a crown, a band and blades, extending between this crown and this band, these blades defining liquid flow channels therebetween. This runner is characterized in that the ratio of the maximum thickness of each blade to the average developed length of the average fibre thereof is included between 0.1 and 0.2, while, at the level of the leading edge of this blade, the average fibre is oriented, over essentially the entire height of the leading edge, along a straight line which forms an angle ($\alpha$) greater than 90° in relation to the linear speed of advance of the leading edge of the blade in the direction of rotation of the runner.

Thanks to the invention, the combination of the particular orientation of the leading edge and of the maximum thickness of the blades allows functioning without creating detrimental eddies or phenomena of cavitation.

According to other advantageous aspects of the invention, this runner incorporates one or more of the following characteristics:

The aforementioned ratio is greater than 0.13 and, preferably greater than 0.15.

The average angle between the linear speed of advance of a blade at the level of its leading edge and the average fibre of this blade at the level of this edge is included between 110° and 1400.

Each blade is formed by a skin constituting its lateral faces and defining a hollow internal volume of the blade. Such a structure makes it possible to envisage the creation of relatively thick blades without their mass being too great and without the cost price of material being too high. In that case, the skin may be metallic or made of composite material. It may also be provided that the skin be formed by assembling two plates respectively constituting the pressure side and the suction side surface of the blade. According to an advantageous aspect, the internal volume of the blade may be lined with a filling material.

The invention also relates to a Francis hydraulic turbine which comprises a runner such as described hereinabove.

BRIEF DESCRIPTION OF THE DRAWINGS

The invention will be more readily understood and other advantages thereof will appear more clearly in light of the following description of a preferred embodiment of a Francis turbine runner in accordance with its principle, given solely by way of example and made with reference to the accompanying drawings, in which.

DESCRIPTION OF THE PREFERRED EMBODIMENT

Figure 1:
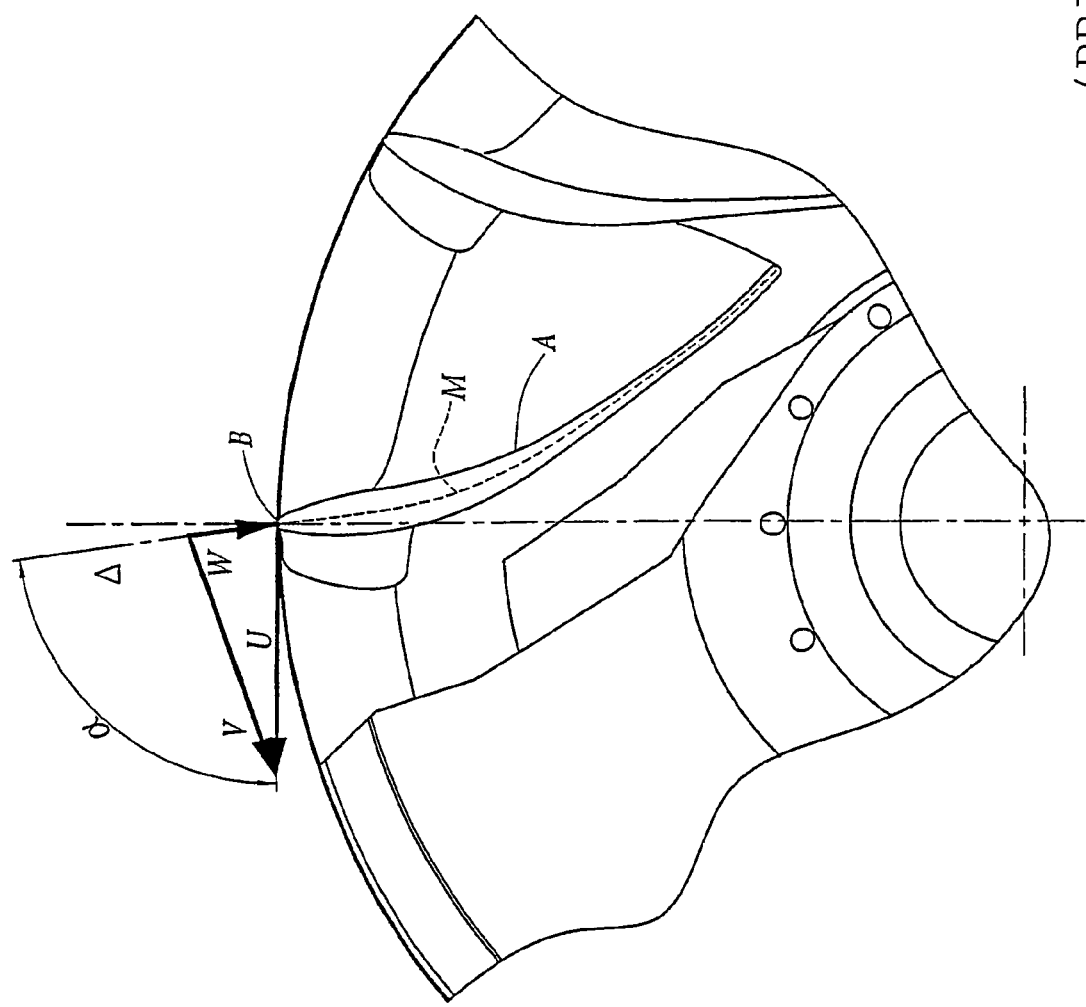
FIG. 1 is a fragmentary plan view of a portion of a conventional Francis turbine.
Figure 2:
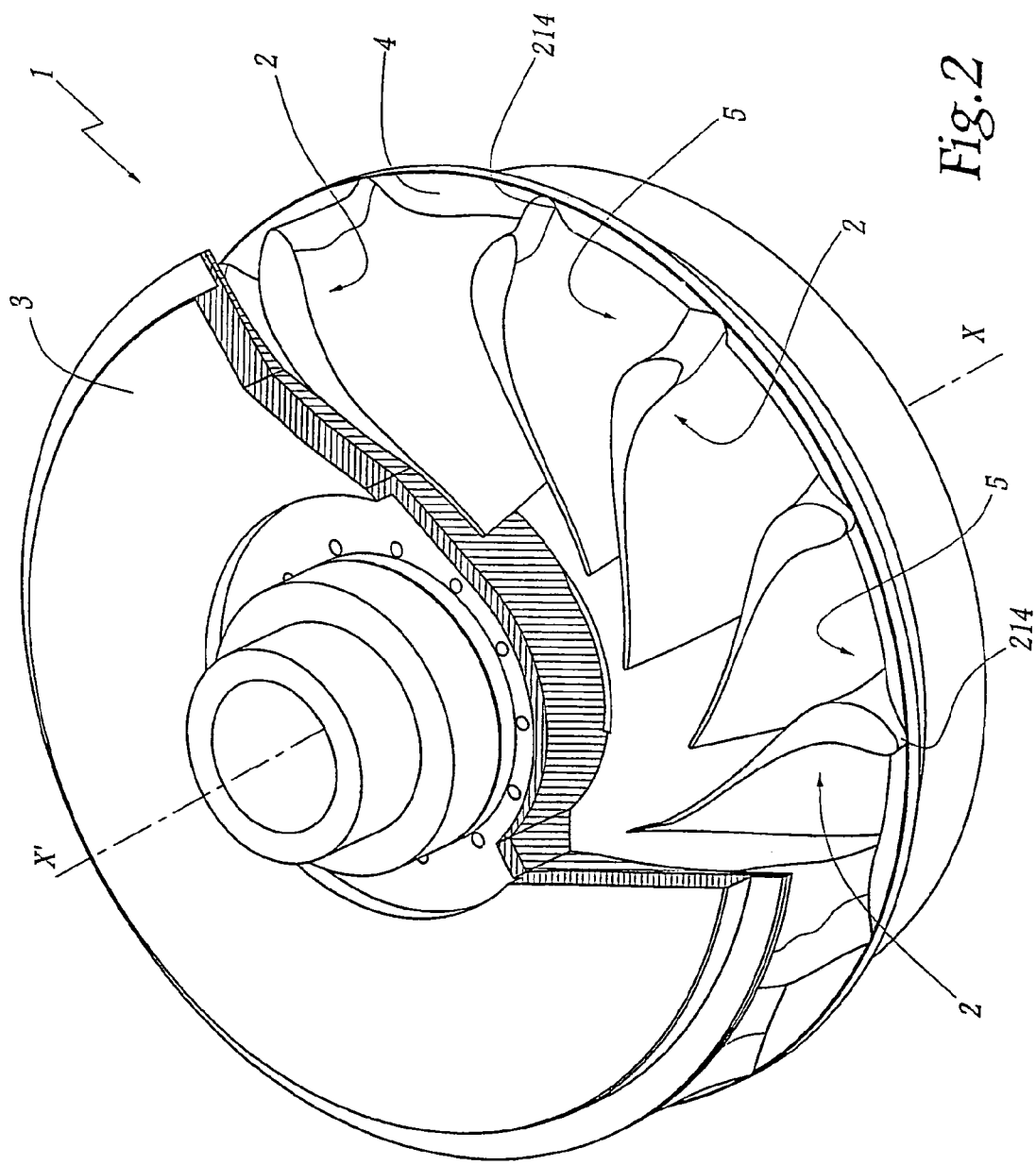
FIG. 2 is a perspective view having portions broken away of a Francis turbine runner according to the invention.
Figure 3:
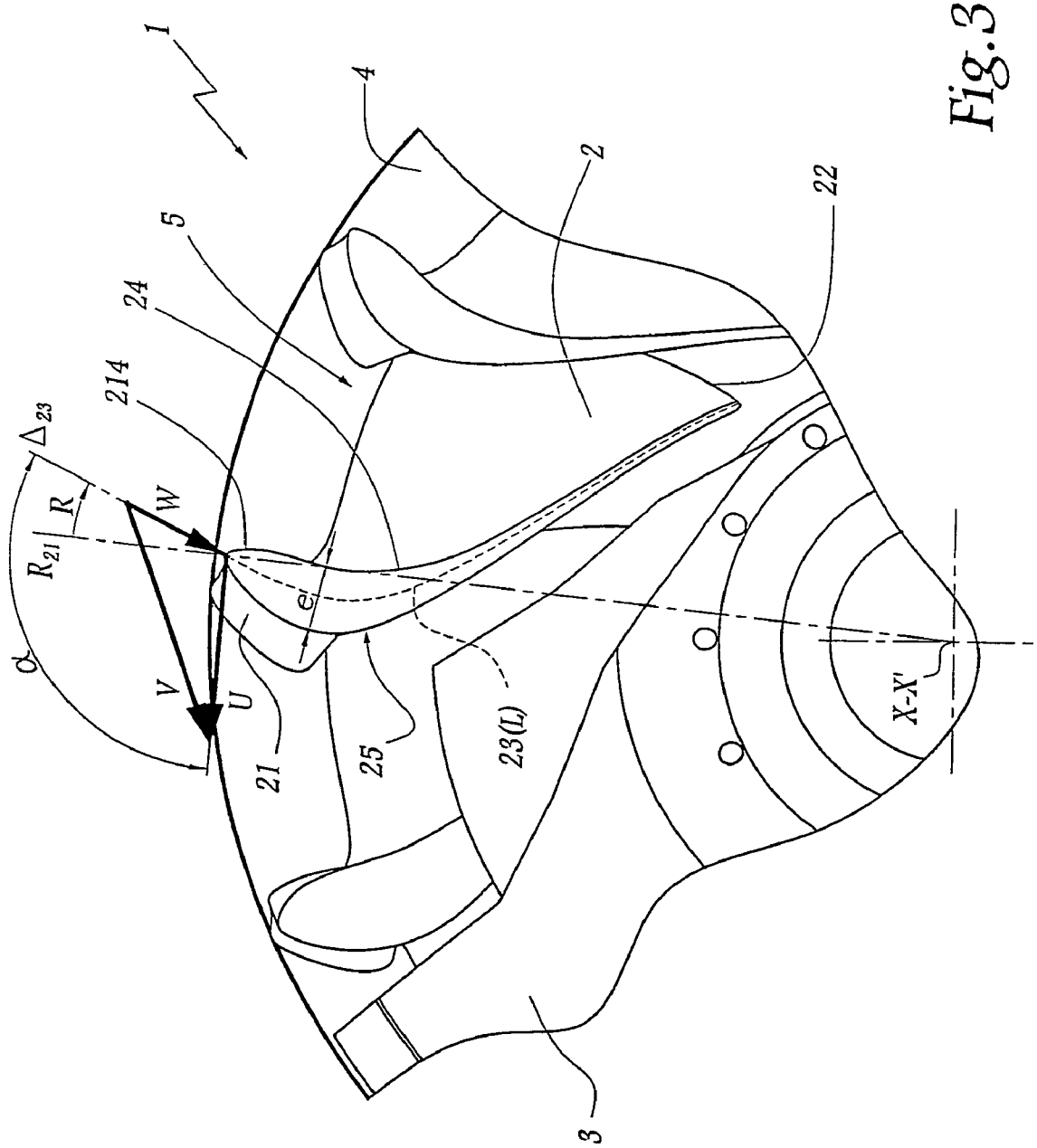
FIG. 3 is a view similar to FIG. 1 of the turbine of FIG. 2.
Figure 4:
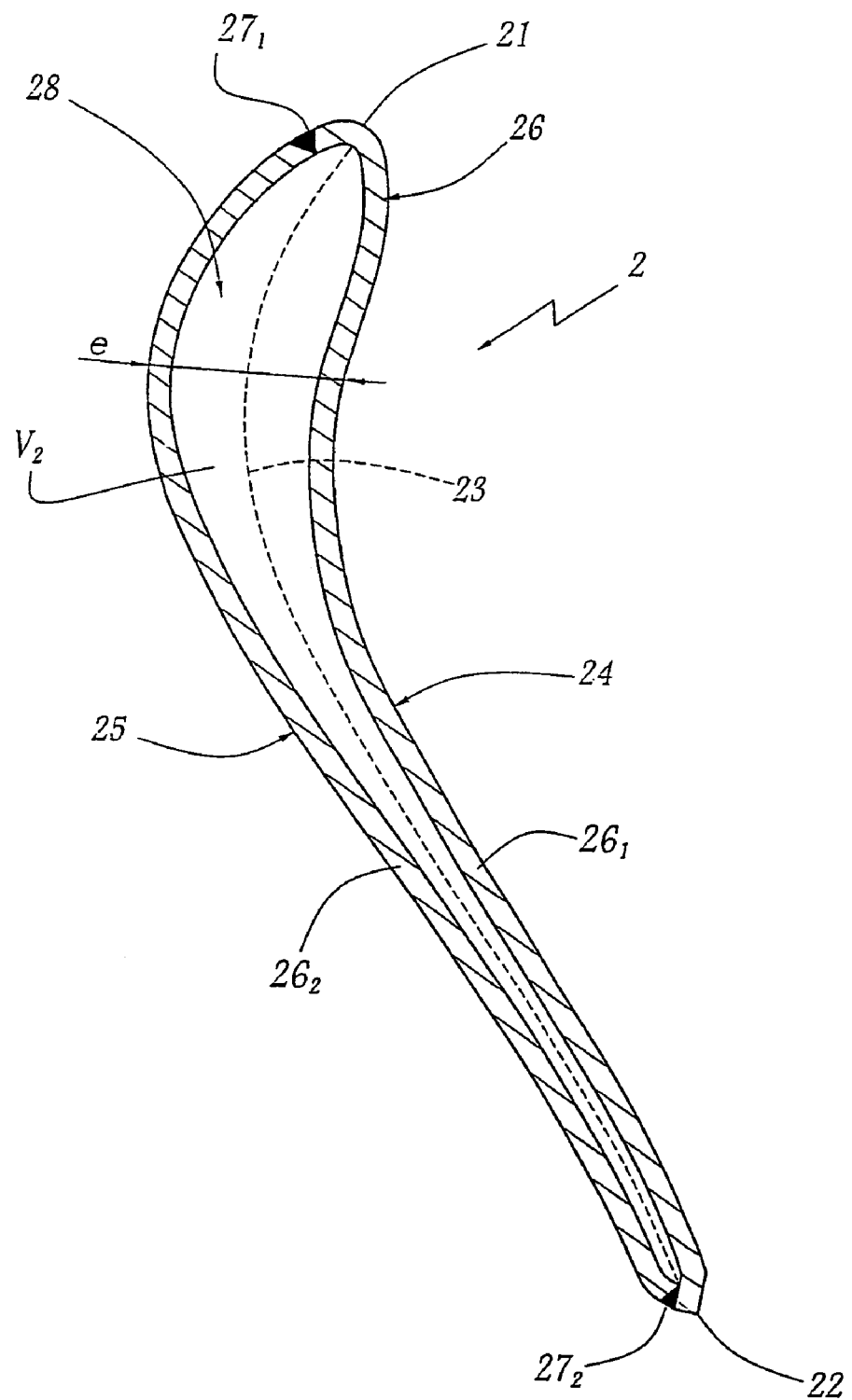
FIG. 4 is a principle transverse section, on a larger scale, of a blade of the runner of FIGS. 2 and 3.

The runner 1 shown in FIGS. 2 to 4 comprises identical blades 2 distributed about a central axis X–X' of rotation of the runner 1. A crown 3 is provided in the upper part of the runner 1, while a band 4 borders the lower, radial and external part of the blades 2. A flow channel 5 is thus defined between each pair of two adjacent blades 2, this channel being bordered by the crown 3 and the band 4.

21 denotes the leading edge of a blade 2.22 denotes its trailing edge. The average fibre 23 of the blade 2 is defined as being, in each transverse plane of this blade, a curve located at equal distance from the pressure side surface 24 and from the suction side surface 25 of the blade 2.

L denotes the average length of this fibre 23, this average being taken as equal to the half-sum of the length of the average fibre of a blade 2 at the level is of the crown 3 and at the level of the band 4.

e denotes the maximum thickness of the blade 2.

The geometry of the blade 2 is chosen so that the ratio e/L is included between 0.1 and 0.2, i.e. that e represents between 10 and 20% of L.

Conclusive tests have been conducted with values of e/L included between 0.13 and 0.18. In particular, a runner with a ratio e/L equal to about 0.16 functions very satisfactorily.

In addition, the geometry of the blade 2 is such that, in the vicinity of the leading edge 21, the neutral fibre 23 extends along a straight line $\Delta_{23}$ making an angle $\alpha$ greater than 90° with respect to the linear speed of advance U of the leading edge 21.

The angle $\alpha$ has an average value over the height of the edge 21 included between 110° and 140°, preferably with a maximum value less than 150°.

The configuration shown in FIG. 3 is that which prevails over essentially the entire height of the leading edge 21 between its point of attachment on the crown 3 and its point of attachment 214 on the band 4.

In other words, at the level of the leading edge 21, the average fibre 23 oriented from the trailing edge 22 towards the leading edge 21 extends in the direction of the straight line $\Delta_{23}$ which, with respect to a radius $R_{21}$ of the runner 1 passing through the leading edge 21, is opposite the linear speed U of advance of the edge 21. In FIG. 3, one passes therefore from the radius $R_{21}$ to the straight line $\Delta_{23}$ by a rotation R in the inverse trigonometric direction. If the runner rotates in inverse direction, i.e. in the inverse trigonometric direction, the aforementioned geometrical distribution is inverted. Thus, with an incident speed V of the water jet similar to that envisaged for the turbine of the prior art and while this jet is oriented in the same direction, there may be obtained, with a relatively low linear speed U of the edge 21 a direction of incidence of the water jet on the leading edge 21 aligned with the straight line $\Delta_{23}$, as figured by arrow W which represents, in FIG. 3, the speed of the incident jet in the referential system of the leading edge.

The relatively great thickness e of the blade 2 is such that, on its pressure side surface 24, there is little risk of creation of eddies.

As shown in FIG. 4, and taking into account its relatively great thickness e, a blade 2 is made with a metallic skin 26 surrounding a hollow volume $V_2$, this allowing an appreciable saving in weight and matter with respect to the case of the blade 2 being provided to be in one piece and solid. The skin 26 is formed by welding two sheet metal plates $26_1$ and $26_2$ at the level of two welding zones $27_1$ and $27_2$.

In a variant, plates of composite matter, comprising a fibre-reinforced organic resin, may be used to constitute the skin 26.

In order to give the blade 2 a good dimensional stability, the volume $V_2$ may be filled with a mass 28 of filling material, for example foam of plastics material.

The invention claimed is:

1. A Francis runner comprising:
   a crown;
   a band; and
   blades extending between said crown and said band, said blades defining liquid flow channels therebetween, wherein a ratio (e/L) of a maximum thickness (e) of each blade to an average developed length (L) of an average fibre of each blade is between 0.1 and 0.2, and at a leading edge of each blade, said average fibre is oriented, over essentially an entire height of the leading edge, along a straight line ($\Delta_{23}$) forming an angle ($\alpha$) greater than 90° relative to a line (U) defining a direction of rotation of the leading edge of the runner.

2. The runner according to claim 1, wherein said ratio (e/L) is greater than 0.13.

3. The runner according to claim 2, wherein said ratio (e/L) is greater than 0.15.

4. The runner according to claim 1, wherein said angle ($\alpha$) between the line (U) of each blade at the leading edge and the average fibre of said blade at the leading edge is between 110° and 140°.

5. The runner according to claim 1, each blade is formed by a skin constituting two lateral faces of said blade and defining a hollow internal volume ($V_2$) of said blade.

6. The runner according to claim 5, wherein said skin is metallic.

7. The runner according to claim 5, wherein said skin is made of composite material.

8. The runner according to claim 5, wherein said skin is formed by assembling two plates respectively constituting a pressure side surface and a suction side surface of said blade.

9. The runner according to claim 5, said volume ($V_2$) is lined with a filling material.

10. A Francis hydraulic turbine equipped with a runner, said runner comprising:
    a crown;
    a band; and
    blades extending between said crown and said band, said blades defining liquid flow channels therebetween, wherein a ratio (e/L) of a maximum thickness (e) of each blade to an average developed length (L) of an average fibre of each blade is between 0.1 and 0.2, and at a leading edge of each blade, said average fibre is oriented, over essentially an entire height of the leading edge, alona a straight line ($\Delta_{23}$) forming an angle ($\alpha$) greater than 90° relative to a line (U) defining a direction of rotation of the leading edge of the runner.

* * * * *

UNITED STATES PATENT AND TRADEMARK OFFICE
CERTIFICATE OF CORRECTION

PATENT NO. : 7,195,460 B2 Page 1 of 1
APPLICATION NO. : 10/528142
DATED : March 27, 2007
INVENTOR(S) : Bazin et al.

It is certified that error appears in the above-identified patent and that said Letters Patent is hereby corrected as shown below:

On the title page item (73) the Assignee's Name should read as follows: --Alstom Technology Ltd--.

Signed and Sealed this

Thirty-first Day of July, 2007

JON W. DUDAS
*Director of the United States Patent and Trademark Office*